United States Patent [19]
Cadd et al.

[11] Patent Number: 5,619,530
[45] Date of Patent: Apr. 8, 1997

[54] METHOD AND APPARATUS FOR DETECTING AND HANDLING COLLISIONS IN A RADIO COMMUNICATION SYSTEM

[75] Inventors: Jimmy W. Cadd, Coral Springs; Tracy L. Fulghum, Sunrise, both of Fla.

[73] Assignee: Motorola, Inc., Schaumburg, Ill.

[21] Appl. No.: 612,395

[22] Filed: Mar. 7, 1996

Related U.S. Application Data

[63] Continuation of Ser. No. 222,069, Apr. 4, 1994, abandoned.

[51] Int. Cl.$^6$ ........................................ H04B 1/38
[52] U.S. Cl. .................... 375/219; 370/445; 455/49.1
[58] Field of Search ............................... 375/202, 205, 375/219, 356, 358, 364; 370/18, 32, 60, 82, 85.1–85.4, 85.6, 91–93, 94.1, 95.1, 95.3, 110.1, 110.4, 111; 340/825.5; 395/299, 730; 455/15, 16, 34.1, 49.1, 50.1, 58.1, 58.2

[56] References Cited

U.S. PATENT DOCUMENTS

| | | | |
|---|---|---|---|
| 4,451,827 | 5/1984 | Kahn et al. | 370/94 |
| 4,495,572 | 1/1985 | Bosen | 364/200 |
| 4,584,678 | 8/1986 | Ozeki et al. | 370/85 |
| 5,231,634 | 7/1993 | Giles et al. | 370/95.1 |
| 5,257,398 | 10/1993 | Schaeffer | 455/33.1 |
| 5,335,226 | 8/1994 | Williams | 370/85.2 |
| 5,379,290 | 1/1995 | Kleijne | 370/85.3 |
| 5,383,185 | 1/1995 | Ambruster et al. | 370/93 |
| 5,390,181 | 2/1995 | Campbell et al. | 370/85.3 |

*Primary Examiner*—Stephen Chin
*Assistant Examiner*—Amanda T. Le
*Attorney, Agent, or Firm*—Andrew S. Fuller

[57] ABSTRACT

A radio communication system (10) has multiple transceivers (12, 14) attempting to initiate communications on a shared communication channel substantially simultaneously. A method for detecting and handling potential channel use collisions is provided for an initiating transceiver (12, 14). The transceiver (12, 14) transmits on the communication channel, a message including an identifying code word. The transceiver (12, 14) then receives data in a predetermined slot of the communication channel, and compares this data with the code word transmitted. A channel use collision is detected when the data received is not equal to the code word transmitted.

11 Claims, 4 Drawing Sheets

5,619,530

METHOD AND APPARATUS FOR DETECTING AND HANDLING COLLISIONS IN A RADIO COMMUNICATION SYSTEM

This is a continuation of application Ser. No. 08/222,069, filed Apr. 4, 1994 now abn.

TECHNICAL FIELD

This invention relates in general to a radio communication system, and more particular, to a radio communication system having communication devices operating over shared communication channels.

BACKGROUND

Radio communication systems which support communication among several users operating in wireless environment over radio frequencies are known. The frequencies used by these systems are a subset of the radio frequency spectrum which are organized into one or more radio communication channels, such as frequency channels. In such a system, for example, a communication link may be established between groups of communication devices within the radio system. The communication link is established over one or more frequency channels for the duration of the communication. Generally, the frequency spectrum available for a given radio system is a limited communication resource, and several users may be competing for this resource. Thus, a radio communication system typically employs a frequency management methodology in order to maximize the efficient use of the available frequencies, and to minimize interference among users. This approach is essential where multiple communication links must be established over shared communication channels.

Many frequency sharing methodologies are known in the art. Examples include, channel hopping, direct sequence spread spectrum, time division multiplex, and other similar schemes. Most prior art frequency sharing methods employ an infrastructure to manage the operational aspects of a radio communication system. An infrastructure typically includes a base station, or some other type of controller, which manages frequency assignments, user access, collision detection and resolution, and other operational aspects of a radio system. These controllers tend to represent a significant cost in the establishment of a radio communication system.

Low cost radio communication systems are becoming an increasingly important segment of the wireless communication market. These low cost systems must also successfully manage frequency usage among users in order to maximize efficiency and throughput. Some low cost systems involving self-organizing units employ frequency management methodologies which do not require the use of a central controller. However, without a central controller, frequency management issues, such as collision detection and resolution, become more difficult. Therefore, it is desirable to have frequency sharing management methodologies which are suitable for low cost radio communication systems.

DETAILED DESCRIPTION OF THE PREFERRED EMBODIMENT

Figure 1:
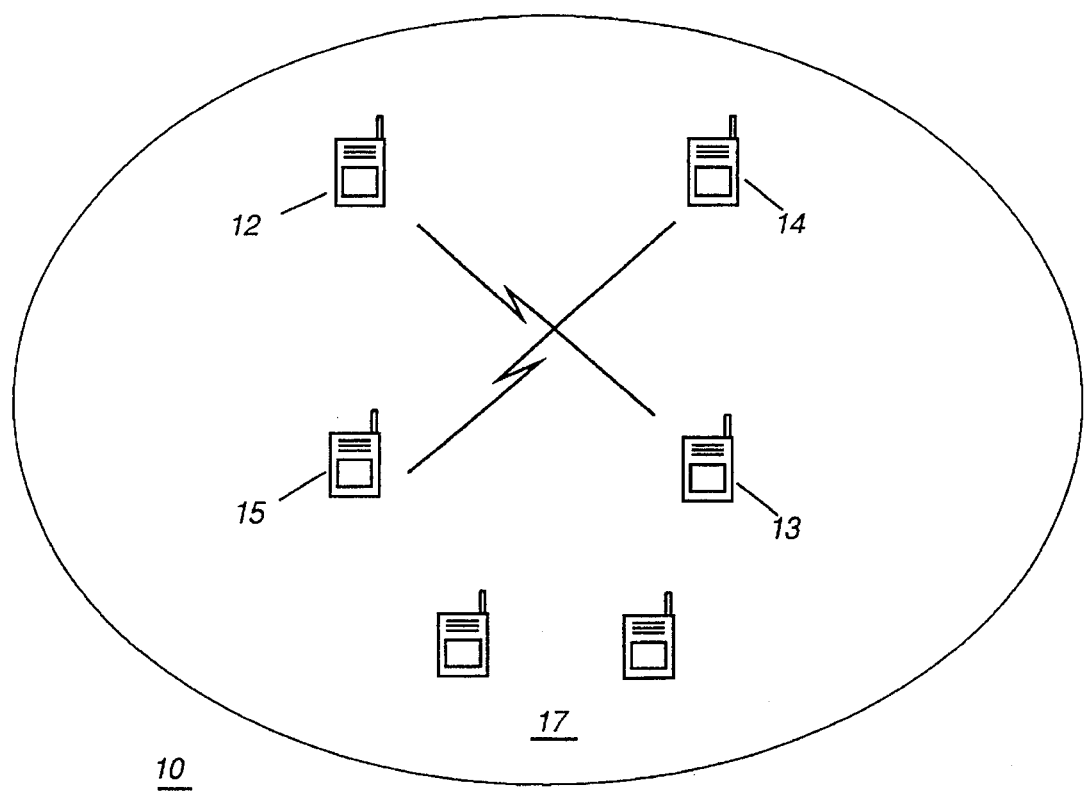
FIG. 1 is a radio communication system having a group of communicating transceivers including two initiating transceivers, in accordance with the present invention.

Referring to FIG. 1, a radio communication system 10 is shown in accordance with the present invention. The radio communication system 10 includes at least two pairs of communication devices sharing a communication channel. In the preferred embodiment, the communication devices are two-way portable radio transceivers capable of establishing radio frequency (RF) communication links. Other types of communication devices may be used, such as mobile radios, base stations, and the like. The radio communication system 10 depicted has two initiating transceivers 12, 14 attempting, substantially simultaneously, to establish a communication link with two target transceivers 15, 13, over a shared communication channel. When both initiating transceivers 12, 14 attempt to use the communication channel simultaneously in the same general coverage area, a channel collision occurs which may adversely affect the integrity of the communication link. In a centrally managed radio communication system 10, such channel use conflicts would be resolved by a controller, a base station, or the like. However, the radio communication system 10 of the preferred embodiment operates without infrastructure support, and consequently does not have a controller or a base station to manage channel use allocation or other system management functions typically associated with a centrally managed radio system 10. The present invention provides a protocol for detecting and handling channel use collisions occurring during an attempted acquisition of a shared communication channel. This protocol is particularly suitable for use in a decentralized radio communication system 10.

In the preferred embodiment, the transceivers 12, 13, 14, 15, 17 operate in a short range decentralized communication system 10 on communication channels under a channel hopping protocol. Other channel sharing protocols may be used which incorporates the concepts of the present invention. The communication channels comprise a plurality of frequencies organized into a sequence of frequency channels. The communication channel may comprise one or more frequency channels, such as a transmit and receive frequency pair or a similar grouping. As mentioned earlier, there is no infrastructure to govern channel allocation and use. However, each transceiver 12, 13, 14, 15, 17 is capable of establishing communication links within the system 10, including deciding which communication channel to use and at what time. In the preferred embodiment, communication links are established asynchronously on an acquisition communication channel, and once established, handshaking occurs between the initiating transceivers 12, 14 and target transceivers 13, 15 to enable further communications. The present invention provides a protocol which allows the initiating transceivers 12, 14 and target transceivers 13, 15 to cooperate in detecting and resolving a collision occurring while attempting to access the acquisition communication channel.

Figure 2:
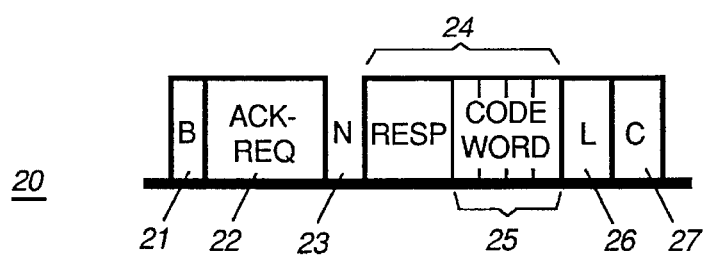
FIG. 2 is a representation of a communication frame for a acquisition request.

The protocol of the present invention involves the organization of the communication channel into a frame structure containing predetermined slots for communicating specific information. FIG. 2, is a representation of a frame structure for an acquisition request frame 20 used communicate on the acquisition communication channel. The acquisition request frame 20 contains slots set aside for transmissions by the initiating transceiver 12, 14, and transmissions from the target transceiver 15, 13, or other transceivers 17. The slots may comprise a specific frequency, time period, or other configuration, depending on the specifications of the communication channel. The acquisition request frame 20 has predetermined slots including a channel busy slot 21, an acknowledge request slot 22, a noise threshold measurement slot 23, a transceiver response slot 24, a communication link establish slot 26, and a collision detect slot 27. When an initiating transceiver 12, 14 attempts to establish a communication link with a target transceiver 15, 13, the initiating transceiver 12, 14 transmits an acknowledge request in the acknowledge request slot 22 and receives an acknowledge response in the acknowledge response slot 24. At least a portion 25 of the response slot 24 is reserved for the transmission of a code word, the details of which will be described below. The initiation of transmission on the acquisition channel is asynchronous. Generally, the initiating transceiver 12, 14 will first check the acquisition channel to determine if it is busy before attempting to use the acquisition channel. A collision, for purposes of this discussion, does not occur if the initiating transceiver 12, 14 attempts to use the acquisition channel and determines, by monitoring that channel, that the channel is busy. If the channel is busy, the initiating transceiver 12, 14 may, for example, delay transmission on the acquisition channel for a predetermined time period. If the channel is not busy, the initiating transceiver 12, 14 attempts to use the acquisition channel by transmitting an acknowledge request as described above, and also transmits a channel busy signal in the channel busy slot 21. If a collision occurs between two or more initiating transceivers 12, 14, the acquisition request flames corresponding to the transmissions would be closely synchronized. A typically separating time period between transmissions of the acquisition request frame 20 could be in the range of several hundred microseconds.

Figure 3:
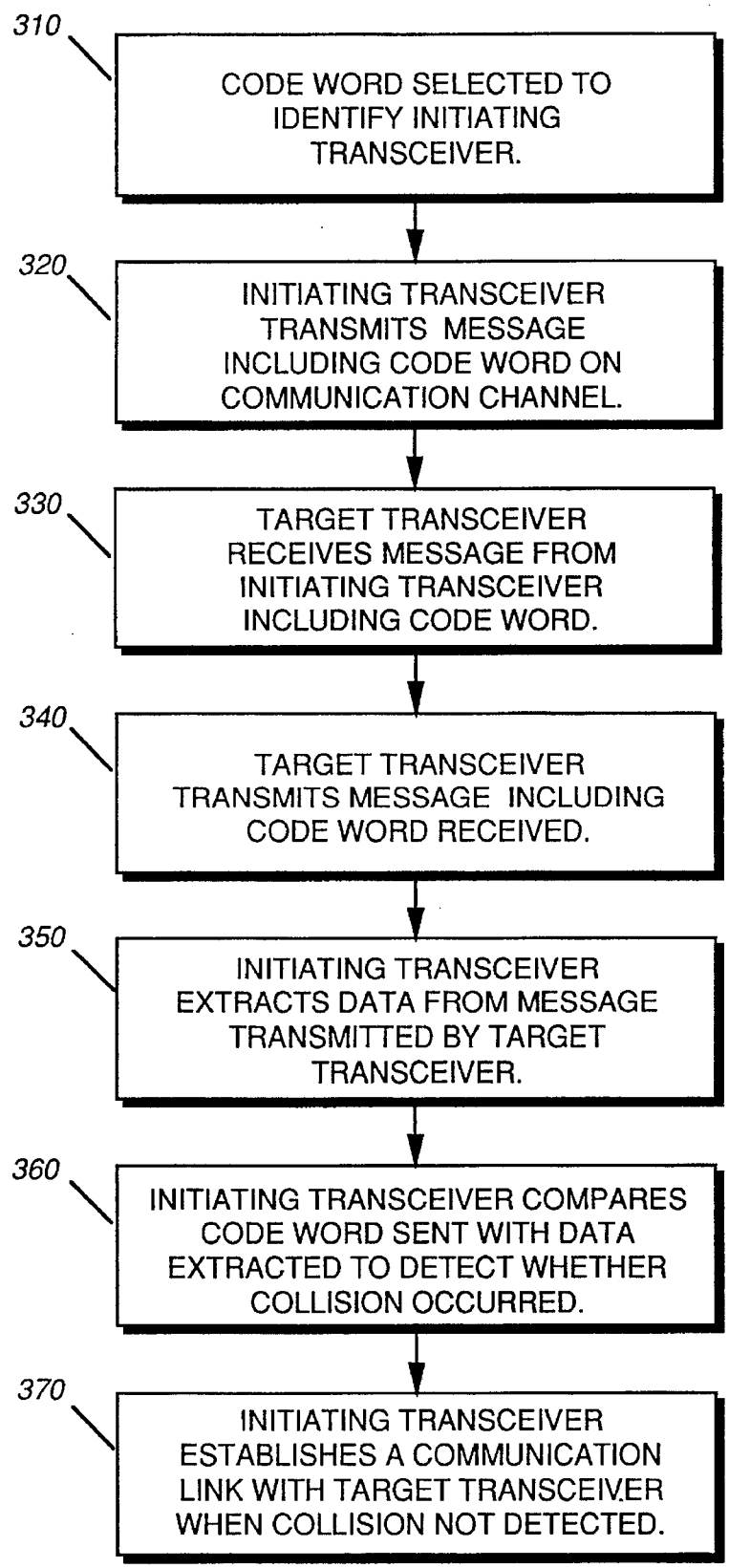
FIG. 3 is a flowchart of procedures used by a transceiver to establish a communication link, in accordance with the present invention.

FIG. 3 is a flow chart of procedures used by a transceiver to detect a collision occurring while attempting to establish the communication link, in accordance with the present invention. In the radio communication system 10, there are at least two transceivers 12, 14 attempting to initiate communications with one or more target transceivers 15, 13. Under the protocol, a code word is a selected to identify each transceiver capable of initiating communications within the system, step 310. Thus, a first code word is selected to identify the first initiating transceiver 12, a second code word, is selected to identify the second initiating transceiver 14, and so on. Preferably, each code word is randomly selected to be of a predetermined size. In the preferred embodiment, four bit code words are used.

A transceiver wishing to initiate communications on the acquisition communication channel first determines when the acquisition communication channel is unoccupied. The transceiver monitors for a predetermined time period the communication channel to detect whether there is communication activity. In the preferred embodiment, carrier sense is used to determine communication activity in the communication channel. Upon determining that there is no communication activity, indicating that the communication channel is unoccupied and available for use, the initiating transceiver 12, 14 transmits a channel busy signal within the channel busy slot 21 of the acquisition frame to reserve the communication channel. The transceiver also transmits a message including an acknowledge request on the communication channel, step 320. The acknowledge request includes the code word identifying the initiating transceiver 12, 14, along with the identification information for the target transceiver 15, 13.

The target transceiver 15, 13 monitors the acquisition channel and detects and receives the message from the initiating transceiver 12, 14, step 330. Although a collision might have occurred, there might be sufficient information on the communication channel for the target transceiver 15, 13 to be able to detect its identifier. This may be the case, for example, if the target transceiver 15, 13 is sufficiently close to the initiating transceiver 12, 14. In another case, there may be multiple target transceivers and some target transceivers might be able to receive and decode the acknowledge request message while others cannot. After receiving the message from the initiating transceiver 12, 14, the target transceiver 15, 13 responds to the message in the acknowledge response slot 24, step 340. The acknowledge response transmitted by the target transceiver 15, 13 includes the code word received from the initiating transceiver 12, 14 in the acknowledge request.

Preferably, the target transceiver 15, 13 conveys the code word in the acknowledge response using ON/OFF key modulation. The use of ON/OFF key modulation in combination with carrier sense detection, provides a simple scheme for implementing the collision detection protocol. While waiting for a response from the target transceiver 15, 13, the initiating transceiver 12, 14 samples the acquisition communication channel, to establish the noise versus interference threshold level. The noise threshold measurement slot 23 of the communication channel is reserved for such purposes. Next, the initiating transceiver 12, 14 receives the acknowledge response transmitted by the target transceiver 15, 13. The acknowledge response, which is conveyed in ON/OFF key modulation, is compared against the noise/interference threshold level and data is extracted which is expected to be the code word initially transmitted, step 350. The initiating transceiver 12, 14 then detects whether a collision occurred by comparing the data extracted from the acknowledgment response with the code word that it had previously transmitted to the target transceiver 15, 13, step 360. If the code word originally transmitted is the same as that retrieved from the acknowledgment response, the initiating transceiver 12, 14 checks the collision detection slot 27 for a collision detect signal. The presence of a collision detect signal would indicate that another transceiver had detected a collision and had broadcasted the collision signal. If a collision detect signal is present, the initiating transceiver 12, 14 proceeds as if it had detected a collision. If no collision occurred, then a communication link with the target transceiver 15, 13 is established, step 370. In the preferred embodiment, the communication link is established by transmitting a message including an identifier for a preferred communication channel to the target transceiver 15, 13. If the code word retrieved from the acknowledgment response is not equal to the code word sent by the initiating transceiver 12, 14, a collision has occurred and a collision handling procedure is executed. When a collision occurs, several initiating transceivers might be concurrently executing the collision detection procedure described above.

An initiating transceiver 12, 14 detecting a collision transmits a collision detect signal in the collision detect slot 27 of the acquisition request frame 20. Typically, the collision detected signal is received by the target transceiver 15, 13 which transmits or echoes the collision detect signal within the collision detect slot 27. Echoing of signals occurs, such that the signals can be broadcast over a wider coverage area. In the preferred embodiment, the initiating and target transceivers 15, 13 all transmit or echo the collision detected signal and the channel busy signal. Note that other transceivers 17 wishing to use the acquisition channel first monitor the channel for communication activity. If communication activity is detected, the other transceivers 17 continue to monitor communications on the acquisition channel to determine when the channel is available.

Recall that a collision is assumed to have occurred if a code word transmitted by the initiating transceiver 12, 14 is not received within the appropriate slot in response from the target transceiver 15, 13. If a collision occurred under the present invention, the acknowledgment response would contain a combination of code words in a response to separate initiating transceivers 12, 14, and assuming both code words where different, none of the initiating transceivers 12, 14 would receive a response containing a code word which it sent out. Rather, the code word received within the acknowledgment response slot 24 would be a combination, such as a logical OR, of the code words sent by both initiating transceivers 12, 14. The ON/OFF key modulation of the randomly selected code words facilitates the implementation of this concept.

The collision resolution procedure also takes advantage of the code word selected for each initiating transceiver 12, 14. A delay period for attempting to reacquire the acquisition channel is imposed based in part on the code word assigned or selected for the initiating transceiver 12, 14. For example, for a four-bit code word there might be a total of 16 possible delay periods. In the preferred embodiment, an initiating transceiver 12, 14 waits for a delay period equal to the value of its code word times a minimum delay increment before attempting to use acquisition channel. An initiating transceiver 12, 14 having a low value code word would attempt to establish communication on the acquisition channel before accepting the initiating transceiver 12, 14 having a higher value code word. Thus, the delay period is code word dependent.

Figure 4:
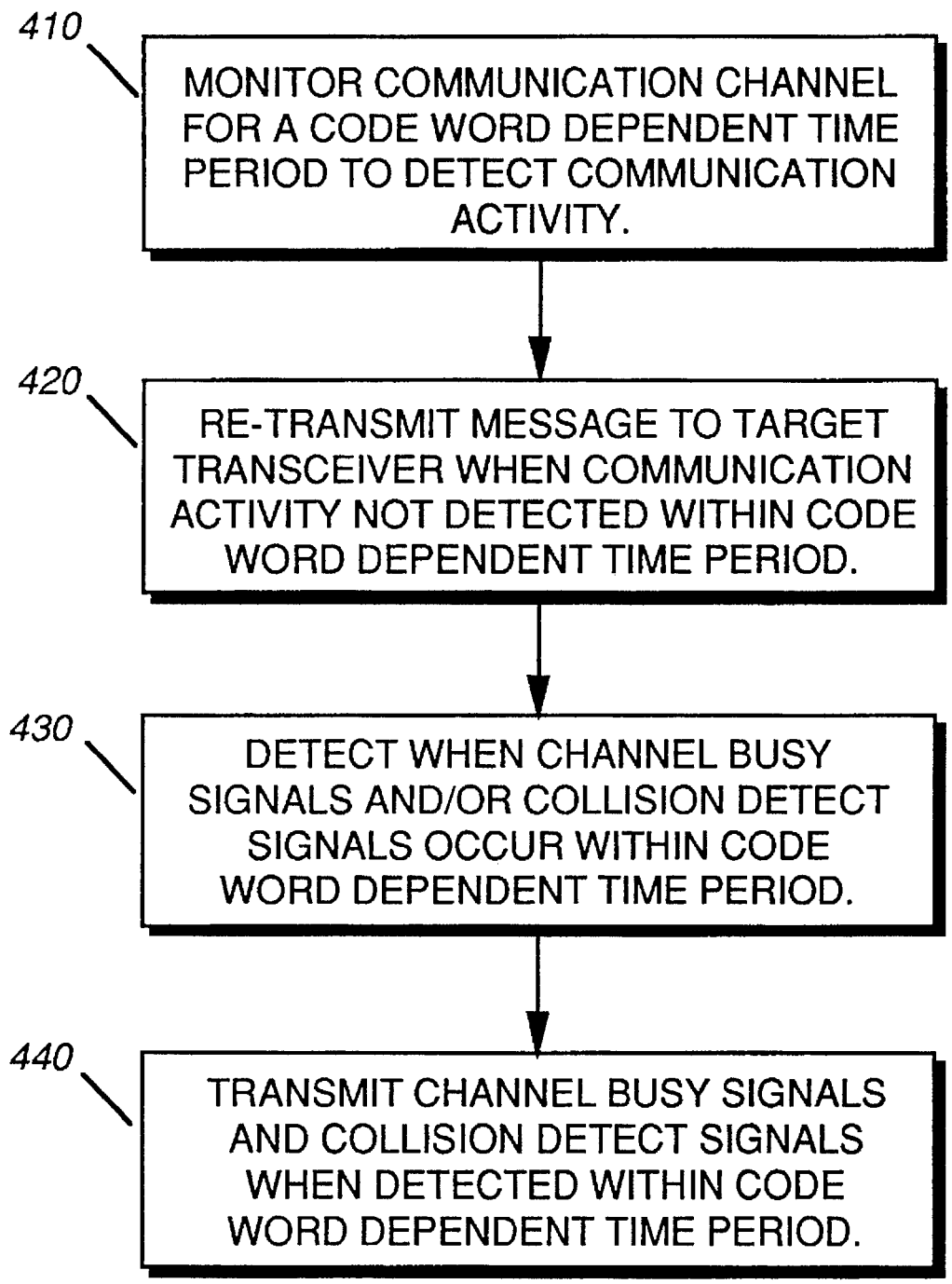
FIG. 4 is a flowchart of procedures used by a transceiver to handle collisions detected while attempting to establish a communication link, in accordance with the present invention.

Referring to FIG. 4, a flowchart of procedures used in collision handling or resolution is shown, in accordance with the present invention. The initiating transceiver 12, 14 monitors the acquisition communication channel for a code word dependent time period to detect communication activity, step 410. In particular, the initiating transceiver 12, 14 would monitor for a channel busy signal. If no communication activity is detected within the code word dependent time period, the initiating transceiver 12, 14 would retransmit an acquisition message including its code word and a channel busy signal on its communication channel, step 420. If in the duration the code word dependent time period, the initiating transceiver 12, 14 detects communication activity, the initiating transceiver 12, 14 will participate in the echoing or re-transmitting of the collision detect and channel busy signals in the respective slots of the acquisition request frame 20, step 430, 440. Overriding timeout periods are included at each waiting state in the collision detection and handling procedures.

Figure 5:
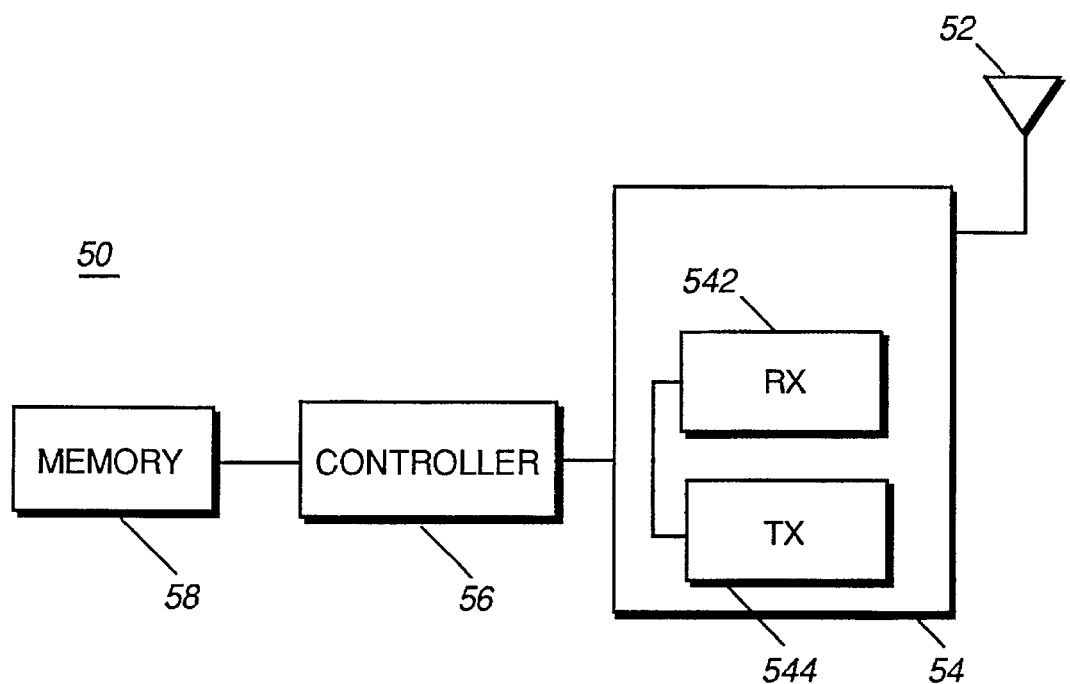
FIG. 5 shows a block diagram of a transceiver capable of participating in the radio communication system, in accordance with present invention.

FIG. 5 shows a block diagram of a transceiver capable of participating in the radio communication system 10 described above, in accordance with the present invention. The transceiver is a two-way radio capable of receive and transmit operations using well known principals. A controller 56 uses logic and other information from an electrically coupled memory portion 58 to control the overall operation of the radio 50. The controller 56 is electrically coupled to an RF portion 54 which includes a receiver 542 and a transmitter 544. The RF portion 54 is electrically coupled to an antenna 52. For receive operations, communication signals are received by the antenna 52 and selectively processed by the receiver 542. Similarly, for a transmit operations, communication signals are processed by the transmitter 544 and irradiated through the antenna 52. The transmitter 544 and the receive 542 operate under the control of the controller 56. According to the invention, the controller 56 cooperates with the memory portion 58 and RF portion 54 to perform the collision detection and handling procedures described above.

In summary, the present invention provides a procedure for detecting and resolving collisions in a decentralized radio communication system 10 having shared communication channels. Using the protocol of the present invention, transceivers participating in the radio communication system 10 cooperate to resolve channel use conflicts without the use of a central controller. Thus, low cost decentralized systems with channel management features typically found in centrally organized systems.

What is claimed is:

1. In a radio communication system having transceivers sharing a communication channel, a method of detecting and handling channel use collisions occurring when multiple transceivers attempt, substantially simultaneously, to establish a communication link with other transceivers, the method comprising the steps of, at the initiating transceiver:

transmitting a message on the communication channel, the message including a code word particular to the initiating transceiver;

receiving particular data on the communication channel;

comparing the particular data with the code word;

detecting that a channel use collision occurred when the particular data is a combination of different code words and the combination does not correspond to the code word; and transmitting a collision detect signal on the communication channel after detecting the channel use collision.

2. The method of claim 1, further comprising the steps of:

monitoring the communication channel for a code word dependent time period to detect communication activity; and re-transmitting the message when communication activity is not detected within the code word dependent time period.

3. The method of claim 2, further comprising the step of participating with other transceivers in a collision handling procedure when communication activity is detected within the code word dependent time period.

4. The method of claim 1, wherein the step of receiving particular data comprises the step of receiving, from a target transceiver, a response to the message including a representation of the code word conveyed in ON/OFF key modulation in a predetermined slot of the communication channel.

5. In a radio communication system having multiple initiating transceivers sharing a communication channel, a method of detecting and handling channel use collisions occurring when multiple initiating transceivers attempt, substantially simultaneously, to establish a communication link with another target transceiver, the method comprising the steps of:

selecting a code word to identify an initiating transceiver;

transmitting, by the initiating transceiver, a message including the code word on the communication channel;

receiving, by a target transceiver, the message from the initiating transceiver;

transmitting, by the target transceiver, a response to the message in a predetermined slot of the communication channel, the response including the code word;

receiving, by the initiating transceiver, data extracted from the predetermined slot of the communication channel;

detecting, by the initiating transceiver, whether a collision occurred by comparing the data with the code word and determining that a collision occurred when the data is a combination of different code words;

establishing, by the initiating transceiver, a communication link with the target transceiver when a collision is not detected; and executing, by the initiating transceiver, a collision handling procedure when a collision is detected.

6. The method of claim 5, wherein the step of selecting a code word, includes the step of:

randomly selecting a code word of a predetermined size.

7. The method of claim 5, wherein the step of executing comprises the steps of:

monitoring, by the initiating transceiver, the communication channel for a code word dependent time period to detect communication activity; and re-transmitting, by the initiating transceiver, the message including the code word, when communication activity is not detected within the code word dependent time period; and detecting and transmitting, by the initiating transceiver, a channel busy signal on the communication channel when communication activity occurs during the code word dependent time period.

8. The method of claim 5, wherein the step of transmitting, by the target transceiver, comprises the step of conveying the code word in ON/OFF key modulation.

9. In a radio communication system having transceivers sharing a communication channel, a method of detecting and handling channel use collisions occurring when multiple transceivers attempt, substantially simultaneously, to establish a communication link with other transceivers, the method comprising the steps of:

providing a code word particular to each of the multiple transceivers;

at a particular transceiver:

initiating transmission on the communication channel;

determining that a collision has occurred on the communication channel with respect to the initiated transmission;

monitoring the communication channel for a particular time period, based on the code word for the particular transceiver, to detect communication activity;

re-initiating transmission on the communication channel when communication activity is not detected within the particular time period; and participating with other transceivers in a collision handling procedure when communication activity is detected within the particular time period.

10. The method of claim 9, wherein the step of participating includes the steps of:

receiving collision detect signals from other transceivers; and echoing the received collision detect signals.

11. The method of claim 9, wherein the step of participating includes the steps of:

receiving channel busy signals from other transceivers; and echoing the received channel busy signals.

* * * * *